United States Patent
Degawa et al.

(10) Patent No.: US 10,782,167 B2
(45) Date of Patent: Sep. 22, 2020

(54) DETECTION DEVICE AND DETECTION METHOD, AND FLUID CONTROL SYSTEM

(71) Applicant: Hitachi, Ltd., Chiyoda-ku, Tokyo (JP)

(72) Inventors: Munenori Degawa, Tokyo (JP); Toshihiko Fukamachi, Tokyo (JP); Tsukasa Fujimori, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 334 days.

(21) Appl. No.: 15/841,593

(22) Filed: Dec. 14, 2017

(65) Prior Publication Data

US 2018/0202847 A1 Jul. 19, 2018

(30) Foreign Application Priority Data

Jan. 17, 2017 (JP) ................................. 2017-005527

(51) Int. Cl.
*G01F 1/66* (2006.01)

(52) U.S. Cl.
CPC .............. *G01F 1/666* (2013.01); *G01F 1/667* (2013.01)

(58) Field of Classification Search
CPC ................................ G01F 1/666; G01F 1/667
See application file for complete search history.

(56) References Cited

U.S. PATENT DOCUMENTS

| | | | |
|---|---|---|---|
| 2001/0020360 A1* | 9/2001 | Tsukamoto | F01K 21/047 60/39.53 |
| 2009/0157329 A1* | 6/2009 | Weightman | G01F 1/58 702/25 |
| 2015/0130732 A1* | 5/2015 | Chang | G06F 3/03545 345/173 |
| 2018/0230797 A1* | 8/2018 | Seshadri | E21B 47/101 |

FOREIGN PATENT DOCUMENTS

JP 2016-109555 A 6/2016

* cited by examiner

*Primary Examiner* — John E Breene
*Assistant Examiner* — L. Anderson
(74) *Attorney, Agent, or Firm* — Crowell & Moring LLP

(57) ABSTRACT

There is provided a fluid detection device that detects a flow velocity or a flow rate of a fluid flowing through a piping, the fluid detection device including: a sound detection unit that detects a sound from the piping, and outputs a frequency signal; a signal processing unit that calculates a strength ratio of the frequency signal on the basis of the frequency signal and a predetermined reference frequency signal; and a data conversion unit that obtains the flow velocity or the flow rate on the basis of the strength ratio of the frequency signal and a predetermined fluid characteristic function.

7 Claims, 9 Drawing Sheets

DETECTION DEVICE AND DETECTION METHOD, AND FLUID CONTROL SYSTEM

BACKGROUND OF THE INVENTION

1. Field of the Invention

The present invention relates to a device and method for detecting a flow velocity or a flow rate of a fluid in piping, and a fluid control system, and in particular to a device and method for detecting a flow velocity or a flow rate from the outside of piping, and a fluid control system.

2. Description of the Related Art

A plant is installed with piping for various fluids, such as gas, steam and liquid, all around. There is also a case where the total length of piping exceeds 1 kilometer. Thus, from the viewpoints of the efficient use of energy and the reduction in maintenance costs of piping, a technique for monitoring and controlling the piping at a high level is required. In particular, there exists a request for, in already-existing piping having no flow meter installed therein, simply and inexpensively monitoring and controlling a flow rate of a fluid flowing through the piping.

As, for example, a fluid detection device that can be retrofitted to piping, Japanese Unexamined Patent Application Publication No. 2016-109555 discloses a clamp-on type ultrasonic flow meter.

SUMMARY OF THE INVENTION

The clamp-on type ultrasonic flow meter disclosed in patent literature 1 includes two ultrasound transducers, a circuit related to transmission and reception of ultrasound, a signal processing circuit, and a display output circuit. The two ultrasound transducers are installed so as to be separated from each other by a constant distance (several centimeters) that is determined by a kind of gas, an outside diameter of piping, a thickness of piping and the like, and so as to be brought into contact with an outer peripheral part of the piping. In addition, an ultrasound having a frequency of 500 kHz or 1 MHz is transmitted and received between the two ultrasound transducers, a difference in the propagation time of the ultrasound is detected by signal processing, and the difference is converted into a flow velocity or a flow rate to display the flow velocity or the flow rate.

Thus, the clamp-on type ultrasonic flow meter uses an expensive pair of transducers, and therefore manufacturing costs are high. In addition, in order to achieve constant measurement sensitivity, it is necessary to install each of the transmission-side transducer and the receiving-side transducer in the piping within a millimeter-based error range, and therefore much labor is required to install the transducers. Therefore, there arises a problem that in a case where a large number of clamp-on type ultrasonic flow meters are installed in each existing piping to build a system that monitors all pipings to control each flow rate, various costs are high, and consequently it is difficult to build the system.

Accordingly, the present invention provides a detection device and a detection method, each enabling easy installation in piping with a simple configuration, and provides a fluid control system.

In order to solve the above-described problems, the configurations set forth in claims are employed. As an example, there is provided a detection method for detecting a flow velocity or a flow rate of a fluid flowing through a piping, the detection method including detecting the flow velocity or the flow rate on the basis of a strength of a sound of the piping.

In addition, as another example, there is provided a fluid detection device that detects a flow velocity or a flow rate of a fluid flowing through a piping, the fluid detection device including: a sound detection unit that detects a sound of the piping, and outputs a frequency signal; a signal processing unit that calculates a strength ratio of the frequency signal on the basis of the frequency signal and a predetermined reference frequency signal; and a data conversion unit that obtains the flow velocity or the flow rate on the basis of the strength ratio of the frequency signal and a predetermined fluid characteristic function.

According to embodiments of the present invention, a detection device and a detection method, each enabling easy installation in piping with a simple configuration, and a fluid control system, can be provided.

DESCRIPTION OF THE PREFERRED EMBODIMENTS

Next, embodiments of the present invention will be described in detail with reference to the drawings. However, the present invention is not limited to the embodiments described below. The present invention also includes, in the technical concept thereof, various modified examples and application examples.

First Embodiment

In the present embodiment, a fluid detection device and a fluid detection method, each of which uses an energy harvesting node, and a fluid control system that uses a fluid detection device, will be described.

Figure 1:
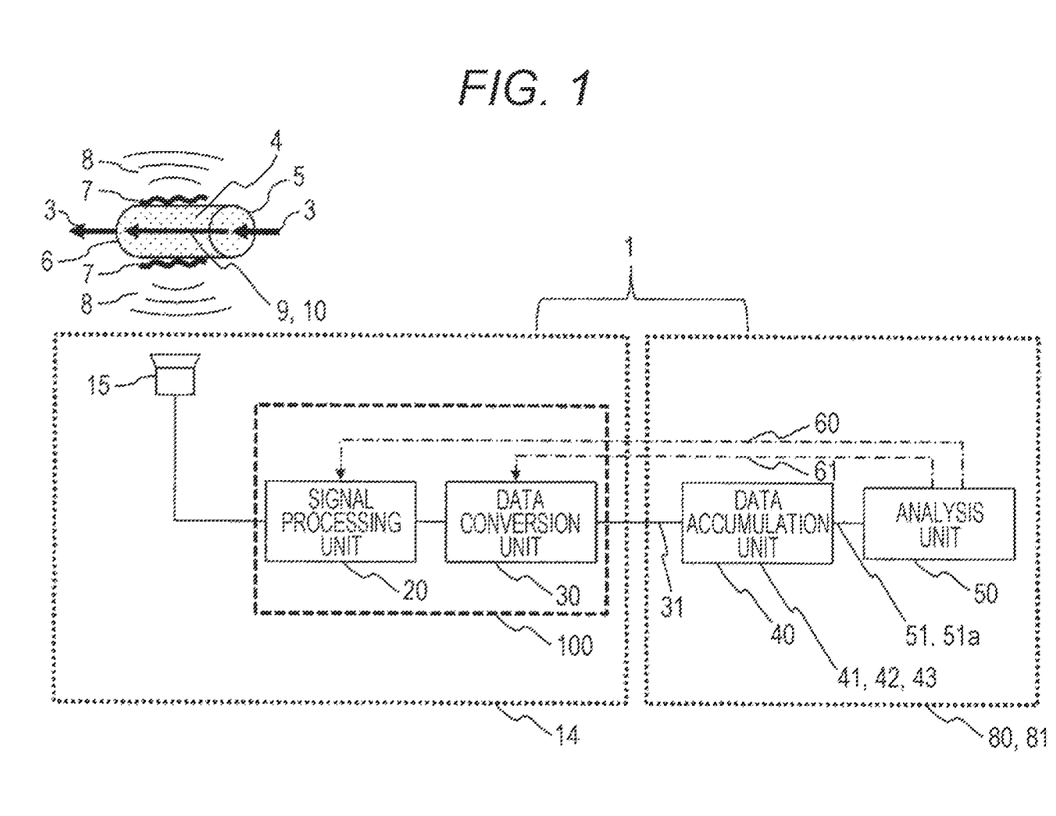
FIG. 1 is an example of a block diagram illustrating a fluid detection device according to a first embodiment of the present invention.
Figure 2:
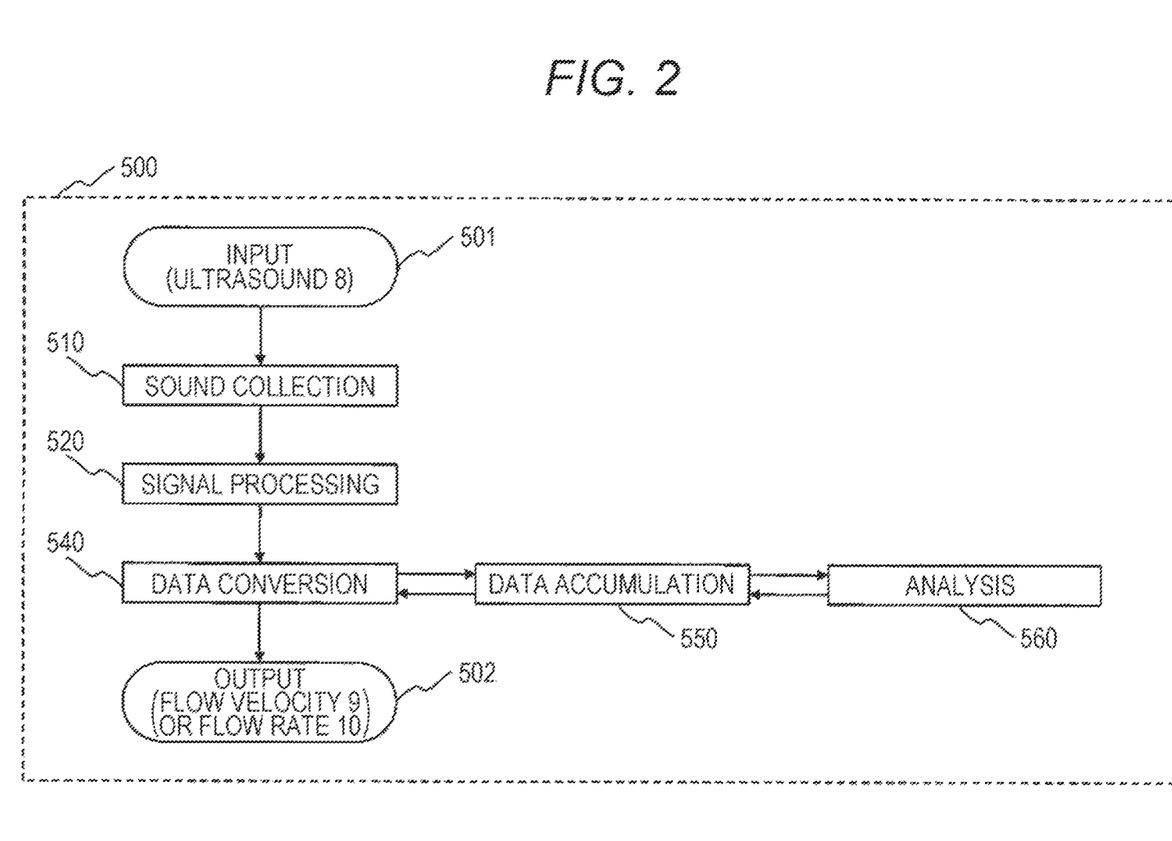
FIG. 2 is an example of a detection flowchart 500 illustrating detection of a fluid by the fluid detection device according to the first embodiment of the present invention.
Figure 3:
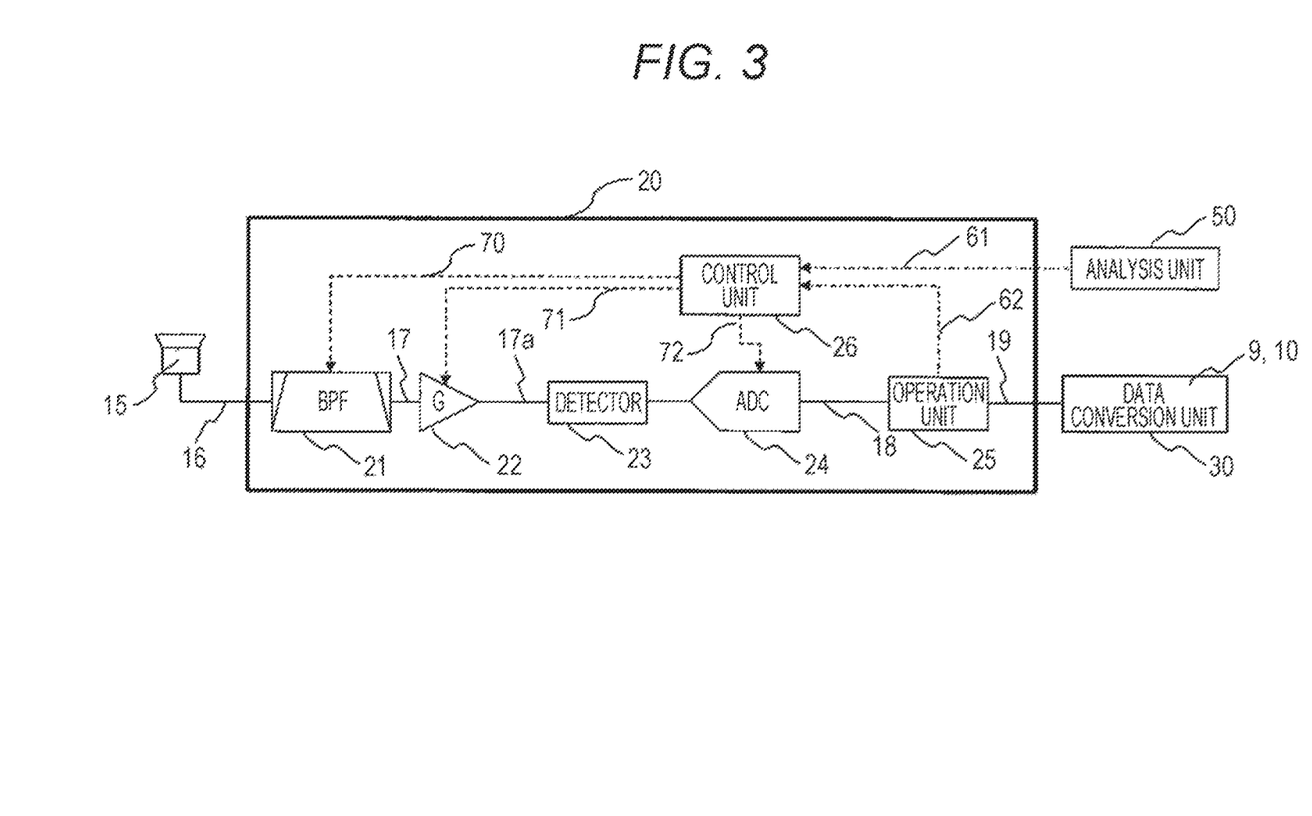
FIG. 3 illustrates, as an example, a detailed configuration around a signal processing unit 20 according to the first embodiment of the present invention.
Figure 4:
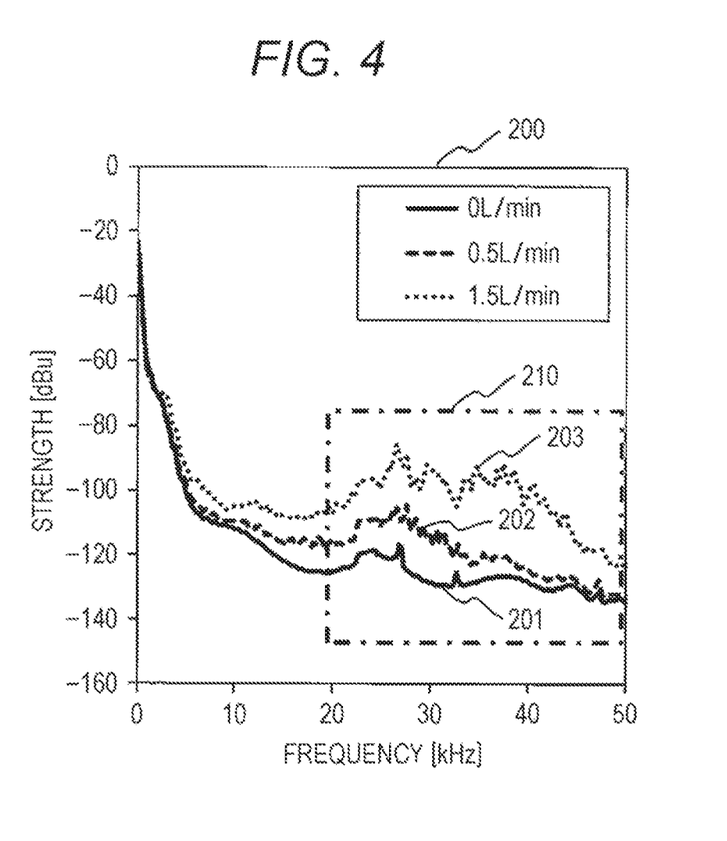
FIG. 4 illustrates a frequency spectrum of an ultrasound signal from piping, the frequency spectrum having been detected by the fluid detection device according to the first embodiment of the present invention.
Figure 5:
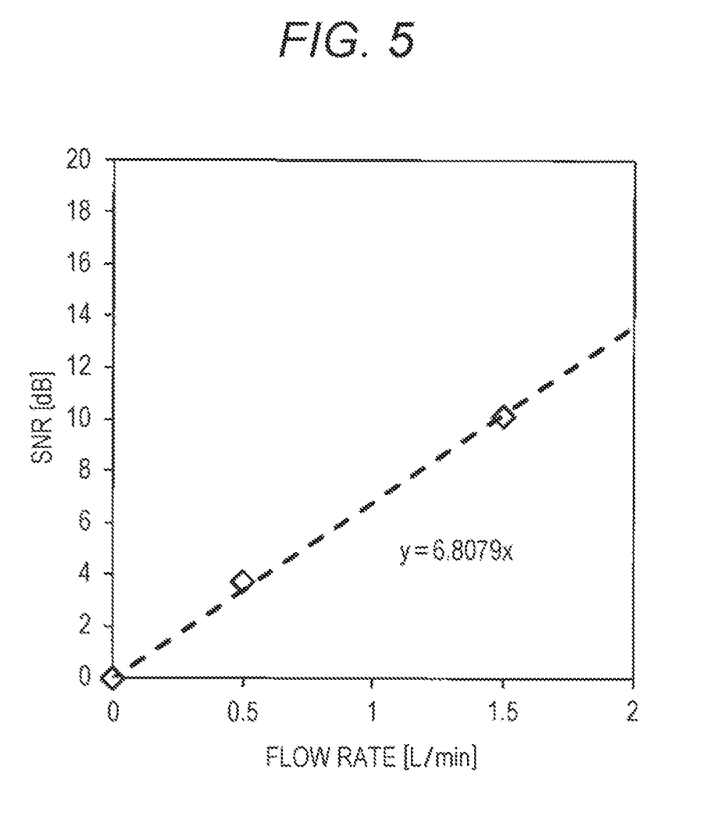
FIG. 5 is a correlation diagram illustrating the relationship between a flow rate of a fluid flowing through piping and a strength ratio of a frequency spectrum.
Figure 6:
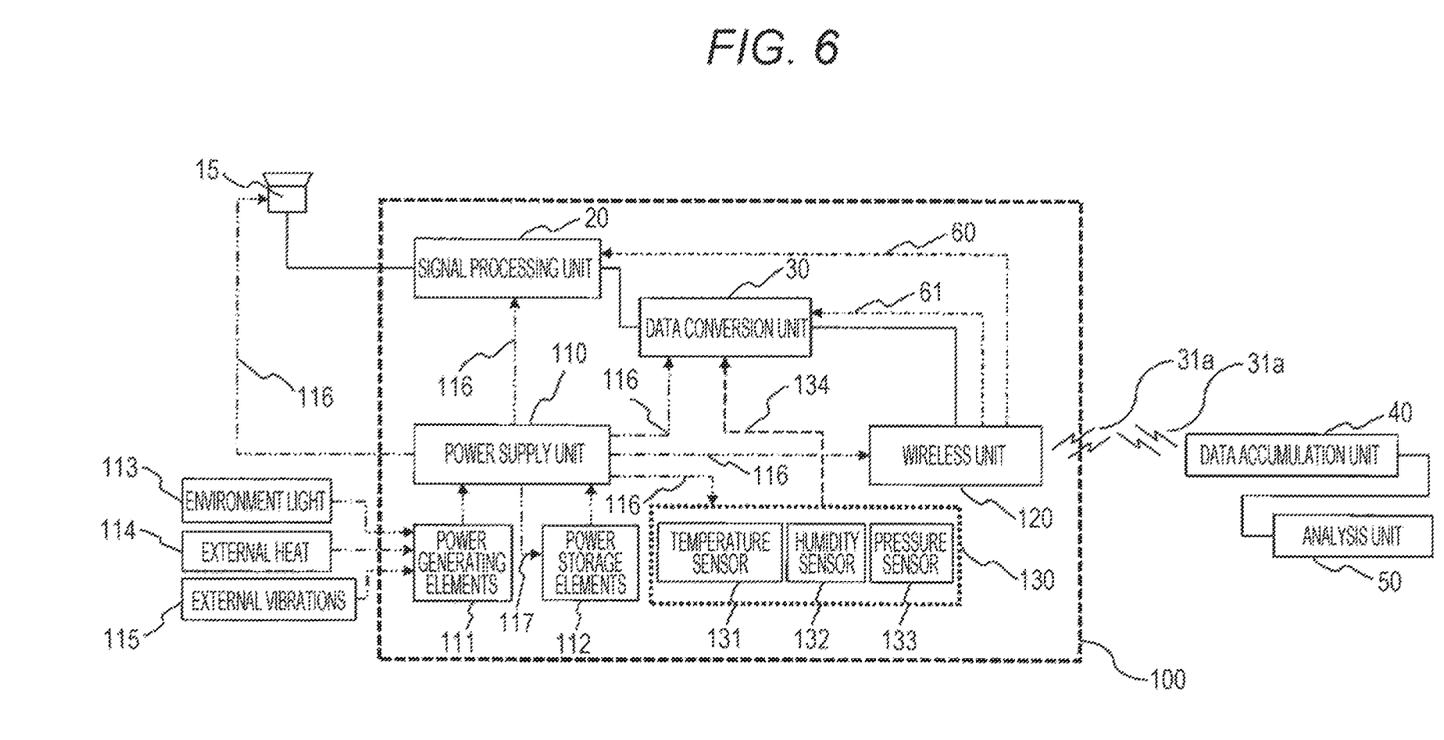
FIG. 6 illustrates, as an example, a configuration of an energy harvesting node according to the first embodiment of the present invention.
Figure 7:
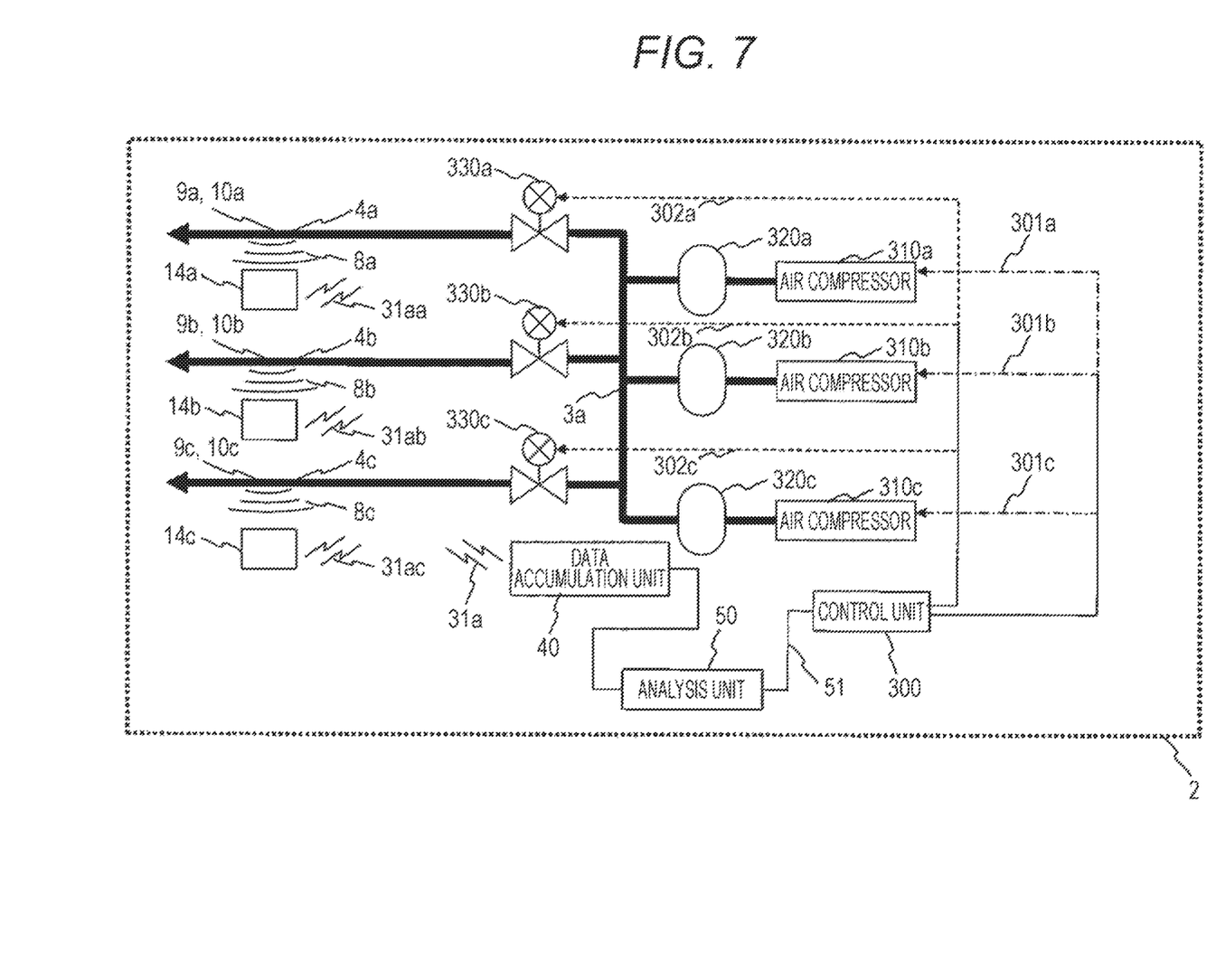
FIG. 7 illustrates, as an example, a block diagram of a fluid control system according to the first embodiment of the present invention.

FIG. 1 is an example of a block diagram illustrating a fluid detection device 1 (hereinafter, may be merely referred to as "detection device") according to the present embodiment. FIG. 2 is an example of the detection flowchart 500 illustrating the detection of a fluid according to the present embodiment. FIG. 3 illustrates, as an example, a detailed configuration around the signal processing unit 20 according to the present embodiment. FIG. 4 illustrates a frequency spectrum of an ultrasound signal from piping, the frequency spectrum having been detected by the detection device according to the present embodiment. FIG. 5 is a correlation diagram illustrating the relationship between a flow rate of a fluid flowing through piping and a strength ratio of a frequency spectrum. FIG. 6 illustrates, as an example, a configuration of an energy harvesting node according to the present embodiment. FIG. 7 is an example of a block diagram illustrating a fluid control system according to the present embodiment.

As shown in FIG. 1, the fluid detection device 1 according to the present embodiment collects an ultrasound 8 that is generated by vibrations 7 of a piping 4 when a fluid 3 flows through the piping 4, and converts the ultrasound 8 into a flow velocity 9 or a flow rate 10. The fluid detection device 1 is provided with: a fluid detection node 14 that includes an ultrasound microphone 15 (sound detection unit), a signal processing unit 20, and a data conversion unit 30; a data accumulation unit 40; and an analysis unit 50.

The detection flowchart 500 illustrating the detection by the fluid detection device 1 will be briefly described with reference to FIG. 2. In input (step 501), sounds including the ultrasound 8 generated by the vibrations of the piping 4 are input. First of all, the sounds are collected (step 510). Next, in signal processing (step 520), only the ultrasound 8 is selectively extracted from a signal containing the collected sounds, and is then converted into a digital value. Subsequently, in data conversion (step 540), the digital value is converted into the flow velocity 9 or the flow rate 10 through specific functions and variables to output the flow velocity 9 or the flow rate 10 (step 502). Here, the signal processing (step 520), the data conversion (step 540) and the like will be described in detail later.

Incidentally, in data accumulation (step 550), data including the flow velocity 9, the flow rate 10, and the functions and variables used in the data conversion (step 540) is accumulated. In addition, in analysis (step 560), the data accumulated in the data accumulation (step 550) is analyzed, the functions and variables are calculated, and the functions and variables are then output to the data accumulation (step 550). Referring to FIG. 1 in detail, the ultrasound microphone 15 detects (collects) the ultrasound 8 (sound) generated by the vibrations 7 of the piping 4.

Using the ultrasound microphone 15 to detect the ultrasound generated by the piping 4 eliminates the need for adjusting the arrangements on the transmission and receiving sides as required by transducers. This makes the installation of the fluid detection device 1 simple and easy. The ultrasound microphone 15 has only to be mounted, for example, on a wall, a floor or the like close to the piping 4 with the ultrasound microphone 15 spaced away from the piping 4.

It should be noted that the sound detection unit is not limited to the ultrasound microphone 15. A microphone may be used as the sound detection unit so long as the microphone is capable of detecting an ultrasound. In addition, a vibration detection unit for detecting vibrations of the piping 4 may be used as an alternative to the sound detection unit. As the result, the vibrations of the piping are directly detected, and therefore the detection precision for detecting the flow rate or the flow velocity is improved.

Further, the sound detection unit may be provided so as to come in contact with the piping 4. This makes it easier to detect the ultrasound generated by the piping 4, and therefore the detection precision is improved. Moreover, it is possible to clearly determine which piping generates the ultrasound, which makes it easy to accumulate data.

On the basis of a frequency signal of the ultrasound detected by the ultrasound microphone 15, and a predetermined reference frequency signal, the signal processing unit 20 calculates a strength ratio of the frequency signal. Here, the reference frequency signal is a frequency signal that is detected by the ultrasound microphone in a state in which a fluid does not flow through the piping 4 (the flow rate is 0 L/min).

The data conversion unit 30 obtains the flow velocity 9 or the flow rate 10 on the basis of the strength ratio calculated by the signal processing unit 20 and a determined fluid characteristic function. It is preferable to store the fluid characteristic function in the data conversion unit 30 beforehand. This enables to obtain the flow velocity 9 or the flow rate 10 at high speed.

It should be noted that the fluid characteristic function is a relational expression determined by the relationship between the flow rate of the fluid and the strength ratio shown in, for example, FIG. 5. The flow velocity 9 or the flow rate 10 may be obtained from the strength ratio by using a constant of a proportional coefficient determined by the relational expression as a fluid characteristic constant as an alternative to the fluid characteristic function.

In addition, the fluid characteristic function (constant) may be stored in the data accumulation unit 40, and when the flow velocity 9 or the flow rate 10 is obtained by the data conversion unit 30, the data accumulation unit 40 may be referred to through a transmission path 31. Consequently, even when the capacity of the fluid characteristic function is large, the flow velocity 9 or the flow rate 10 can be obtained by immediately referring to the fluid characteristic function.

The flow velocity 9 or the flow rate 10, which has been obtained by the data conversion unit 30, is accumulated in the data accumulation unit 40 through the transmission path 31. Here, the transmission path 31 may be based on wired transmission or wireless transmission.

Moreover, it is preferable that the data accumulation unit 40 store: fluid information 41 that includes a kind of fluid flowing through the piping 4 to be detected (when the fluid is a liquid, the fluid information 41 further includes the viscosity); piping information 42 that includes, for example, the shape, outer shape, thickness and material of the piping 4, a straight pipe length before and after the piping 4, and a point at which the piping is bent; and environmental information 43 that includes, for example, the temperature, humidity and pressure of an installation environment (periphery of the piping) for the piping 4. The data accumulation unit 40 may store analysis data 51a of the piping, the analysis data 51a having been obtained at a different point or under other conditions.

The analysis unit 50 performs analysis by using the information 51 including the flow velocity 9 or the flow rate 10 of the fluid flowing through the piping 4, the fluid information 41, the piping information 42, and the environmental information 43, which are accumulated in the data accumulation unit 40, and by using the piping analysis data 51a obtained at a different point or under other conditions.

As an example of the analysis performed by the analysis unit 50, for example, the fluid information 41, the piping information 42 and the environmental information 43, which are detection conditions used when the flow velocity 9 or the flow rate 10 is obtained, are treated as one piece of information 51, and the optimum fluid characteristic function (constant) under certain detection conditions is derived from the large number of pieces of information 51 accumulated in the data accumulation unit 40. Subsequently, on the basis of the obtained fluid characteristic function (constant), the analysis unit 50 inputs a feedback value 61 into the data conversion unit 30 as a correction value for correcting the fluid characteristic function of the data conversion unit 30. Consequently, the flow velocity 9 or the flow rate 10 can be detected with higher precision with an increase in the number of times the flow velocity 9 or the flow rate 10 of the fluid is detected in each piping.

It should be noted that a value used as the feedback from the analysis unit 50 to the data conversion unit 30 is not limited to the correction value for correcting the fluid characteristic function. It goes without saying that similar effects can also be achieved by a correction value that directly corrects a value of the flow velocity 9 or the flow rate 10 obtained on the basis of the fluid characteristic function.

In addition, the analysis unit 50 may derive the optimum signal processing parameter from the accumulated information to input a value of each parameter into the signal processing unit 20 as the feedback value 61. This enables to perform signal processing under the optimum conditions, and eliminates the need for performing unnecessary calculation. Therefore, the power consumption of the fluid detection node 14 can be suppressed.

A feedback value from the analysis unit 50 may be input into the signal processing unit 20 or the data conversion unit 30 wirelessly or wiredly, or by use of a transmission path 31.

As described above, the detection parameter, the fluid characteristic function and the like are optimized by the feedback values 60 and 61, and thus the signal processing unit 20 and the data conversion unit 30 are capable of enhancing the detection performance including the measurement accuracy and measurement precision of the flow velocity 9 or the flow rate 10.

In addition, the analysis unit 50 may be configured to adjust the operation speed of the signal processing unit 20, the operation speed of the data conversion unit 30, and the output frequency of the flow velocity 9 or the flow rate 10 from the data conversion unit 30 in response to time intervals at which the flow velocity 9 or the flow rate 10 changes. As the result, for example, when time intervals at which the flow velocity 9 or the flow rate 10 is kept stable is long, the output frequency can be decreased, and the power consumption of the fluid detection node 14 can be decreased.

Here, the signal processing unit 20 and the data conversion unit 30 may be built into the undermentioned energy harvesting node 100. In addition, the data accumulation unit 40 and the analysis unit 50 may be configured separately from the fluid detection device 1, and may be built into, for example, a concentrator 80 or a cloud server 81. By separating the fluid detection node 14 from the data accumulation unit 40 and the analysis unit 50 in this manner, a plurality of fluid detection nodes 14 are each installed in piping, and data can be accumulated in one data accumulation unit 40 wirelessly or wiredly. Accordingly, a larger number of pieces of information are accumulated, and therefore lower power consumption and higher precision can be achieved in the signal processing unit 20 and the data conversion unit 30 provided in each fluid detection node. Moreover, the data accumulation unit 40 and the analysis unit 50 can be stored in one storage unit, and therefore cost reduction can also be achieved.

Incidentally, in a case where a fluid control system 2 is configured on a small scale, the amount of data including the flow velocity 9 or the flow rate 10 of the piping 4, the fluid information 41 and the piping information 42, which are accumulated in the data accumulation unit 40, is small, and the amount of data analysis is also small. Therefore, using the concentrator 80 enables a smaller scale configuration. Meanwhile, in a case where the scale of the fluid control system is large, and accordingly the amount of data to be handled is large, the amount of analysis also increases. Therefore, it is preferable to use the cloud server 81 having a storage capacity larger than that of the concentrator 80, and having a computing power higher than that of the concentrator 80.

The signal processing unit 20 shown in FIG. 1 will be described in detail with reference to FIG. 3. The signal processing unit 20 includes a bandpass filter (BPF) 21, an amplifier 22, a detector 23, an analog-to-digital converter 24, an operation unit 25, and a control unit 26.

The bandpass filter 21 extracts, from a frequency signal 16 collected by the ultrasound microphone 15, only a frequency signal 17 in a frequency band derived from the ultrasound 8 of the piping 4. This frequency band differs depending on the fluid 3 and the piping 4, and therefore configuring the band of the bandpass filter 21 to be variable from the outside enables to cope with various detection ranges and various kinds of fluids.

The frequency signal 17 is amplified to form a frequency signal 17a by the amplifier 22, and the electric power of the frequency signal 17a is detected as a voltage (strength) by the detector 23. The detected voltage (strength) of the frequency signal 17a is converted into a digital signal 18 by the analog-to-digital converter (ADC) 24, and is then input into the operation unit 25.

Incidentally, by configuring an amplification degree of the amplifier 22 to be automatically variable, or to be variable from the outside, it is possible to prevent the frequency signal 17a from being saturated, and from resulting in an abnormality in the detection. In addition, by configuring sampling conditions (detection parameters) including a sampling frequency, a sampling rate, and the number of samplings to be variable from the outside, the analog-to-digital converter 24 is capable of changing the sampling conditions in response to, for example, time intervals at which the flow velocity 9 or the flow rate 10 changes, and the amount of variation. This enables to reduce the power consumption in the signal processing unit 20.

The control unit 26 controls the frequency band of the bandpass filter 21, the amplification degree of the amplifier 22, and the sampling conditions of the analog-to-digital converter 24 by outputting control signals 70, 71, 72 respectively. In a case where these values are configured to be variable from the outside, the control unit 26 has only to perform the control according to an input value from an external input node (not illustrated). In addition, in a case where the amplification degree and the sampling conditions are configured to be automatically controlled, the control unit 26 has only to perform the control on the basis of the feedback value 60 from the analysis unit 50 and the feedback value 62 from the operation unit 25.

The operation unit 25 determines the signal strength (voltage value) from a value of the digital signal 18, and adjusts a signal depending on the magnitude of the signal. Subsequently, the operation unit 25 outputs the signal to the data conversion unit 30 as a digital signal 19. In addition, the operation unit 25 calculates a strength ratio of the frequency signal on the basis of the signal strength (voltage value) of a predetermined reference frequency signal and the signal strength of the inputted digital signal 18, and outputs the digital signal 19 to the data conversion unit 30.

Moreover, when the magnitude of the signal is not proper, for example, too large or too small, the operation unit 25 outputs, to the control unit 26, such a feedback value 62 that is capable of achieving the optimum sampling conditions and the optimum amplification degree.

In this case, by configuring the digital signal 19 to include a signal indicating an abnormality in detection, it is possible to indicate that the flow velocity 9 or the flow rate 10 detected by the fluid detection device 1 contains the abnormality in detection. Accumulating the data in the data accumulation unit 40, and analyzing the data by the analysis unit 50, enable to grasp specific detection conditions under which an abnormal detection easily occurs. As the result, the feedback value 60 from the analysis unit 50 enables to set a further optimum amplification degree and further optimum sampling conditions to the control unit 26.

Determining from the above, the fluid detection node 14 has only to include at least one ultrasound microphone 15 as a detection element. Therefore, according to the present embodiment, a device configuration can be made simpler in comparison with the case where the transducers are used, and the installation can also be facilitated. In addition, the signal processing unit 20 and the data conversion unit 30 can also be simply configured, and therefore a small-sized detection device with low power consumption can be realized at low costs. Moreover, the ultrasound microphone 15 can be mounted with the ultrasound microphone 15 spaced away from the piping 4, and therefore the ultrasound microphone 15 can be simply and easily mounted.

Next, the fluid characteristic function (constant) will be described with reference to FIGS. 4 and 5 by using, as an example, a case where air is selected as a fluid. The frequency spectrum of the frequency signal 16 collected by the ultrasound microphone 15 is illustrated as a frequency spectrum 200 shown in FIG. 4. As shown in FIG. 4, the flow rate dependency is found in frequency spectra 201, 202, 303 at the time of respective flow rates 0 L/min, 0.5 L/min, 1.5 L/min.

As a frequency band in which the frequency spectra 201, 202, 203 are extracted by the bandpass filter 21, it is preferable to use, for example, a frequency band 210 of 20 kHz or higher. This is because, in general, a frequency band of 20 kHz or higher is defined as an ultrasound band, and there is a possibility that voices, noises and the like, which are noise components, will influence the detection performance in a range of 20 kHz or lower.

In addition, 50 kHz or lower is desirable as an upper limit of the frequency band. Even in the case of 100 kHz or 200 kHz, the detection according to the present embodiment can be performed. However, the frequency band of 50 kHz or lower enables higher detection sensitivity from the viewpoint of the structure of the ultrasound microphone.

The signal extracted in the frequency band 210 is detected, and the detected signal is converted into a signal as a voltage value (strength) of a frequency. Subsequently, the converted signal is further digitally converted, and is then compared with a signal-to-noise ratio (SNR) with reference to a flow rate of 0 L/min. The result of the comparison is shown in FIG. 5. As shown in FIG. 5, a linear fluid characteristic function is obtained as a relational expression of the signal-to-noise ratio for the flow rate. Therefore, even if a flow velocity is not known, the flow velocity can be acquired from the signal-to-noise ratio obtained from the ultrasound detected from the piping 4. In addition, if a shape of the piping is known, a flow rate can be determined from the information and the acquired flow velocity.

Next, the energy harvesting node 100 will be described in detail with reference to FIG. 6. The energy harvesting node 100 is provided with a power supply unit 110, a wireless unit 120, and a sensing unit 130.

The power supply unit 110 supplies the electric power generated by power generating elements 111 or the electric power stored in power storage elements 112 to the ultrasound microphone 15, the signal processing unit 20, the data conversion unit 30, the wireless unit 120 and the sensing unit 130 through a power supply path 116. In addition, the power supply unit 110 has a function of separately performing the supply of the electric power from the power generating elements 111 and the control of electric charging to the power storage elements 112.

Accordingly, for example, by stopping electric charging to the power storage elements 112 immediately after the start of the power generation in the power generating elements 111, the electric power can be directly supplied from the power generating elements 111 to each unit, and therefore the starting time of the fluid detection device 1 can be shortened.

It should be noted that as the power generation energy of the power generating elements 111, there may be mentioned environment light 113, external heat 114, and external vibrations 115. Using the power generation energy described above as a power production source of the electric power enables the energy harvesting node 100 to eliminate the need for supplying the electric power from the outside, and the need for wiring lines therefor.

The wireless unit 120 has a function of transmitting the flow velocity 9 or the flow rate 10 obtained by the data conversion unit 30 to the data accumulation unit 40 through a wireless transmission path 31a, and a function of receiving the feedback values 60, 61 from the data analysis unit 50.

The power supply unit 110 and the wireless unit 120 described above enable the energy harvesting node 100 to eliminate the need for external wiring, and therefore the fluid detection device 1 can be simply and easily installed. In addition, as described above, by configuring the signal processing unit 20 and the data conversion unit 30 to be externally controllable, detection conditions, such as parameters after the installation of the fluid detection device 1, can be automatically or remotely adjusted, and therefore adjustment work and maintenance work after the installation can be made simple and easy.

The sensing unit 130 is composed of, for example, a temperature sensor 131, a humidity sensor 132 and a pressure sensor 133. By using these sensors to measure environmental information including a temperature, a humidity and an atmospheric pressure around the installed energy harvesting node 100, and then by inputting sensing values 134 into the data conversion unit 30, the data conversion unit 30 is capable of correcting the flow velocity 9 or the flow rate 10. This enables to suppress a variation in detection precision causes by an environment surrounding the energy harvesting node 100, and thereby to enhance the detection performance.

It should be noted that as the correction by the sensing values 134, fluid characteristic functions (constants) corresponding to respective sensing values may be held beforehand so as to allow the fluid characteristic function corresponding to each sensing value to be used. In addition, the correction by the sensing values 134 may be configured to use correction functions corresponding to respective sensing values.

Next, the fluid control system 2 that uses the plurality of fluid detection devices 1 will be described with reference to FIG. 7. In the present embodiment, the fluid control system 2 will be described by using an example in which a fluid is air.

The fluid control system 2 includes air compressors 310a, 310b, 310c as air supply sources, and includes respective air containers 320a, 320b, 320c that temporarily store air 3a output from the air compressors 310a, 310b, 310c respectively.

It should be noted that the air containers 320a, 320b, 320c may be integrally configured. This makes the control of the air containers easier.

In the fluid control system 2, the piping 4 from the air containers is in shared use. However, the piping 4 then branches into pipings 4a, 4b, 4c, and valves 330a, 330b, 330c adjust respective flow velocities 9a, 9b, 9c or respective flow rates 10a, 10b, 10c.

The pipings 4a, 4b, 4c are provided with fluid detection nodes 14a, 14b, 14c respectively. The fluid detection nodes 14a, 14b, 14c detect the flow velocities 9a, 9b, 9c or the flow rates 10a, 10b, 10c respectively. The detected flow velocities 9a, 9b, 9c or the detected flow rates 10a, 10b, 10c are accumulated in the data accumulation unit 40 through respective wireless transmission paths 31aa, 31ab, 31ac, and are then analyzed by the analysis unit 50.

In this case, results of analyzing by the analysis unit 50 are output to the control unit 300 that controls the air compressors and the valves. Subsequently, the air compressors are controlled by control values 301a, 301b, 301c respectively so as to optimize the supply amount of compressed air, and opening degrees of the valves are controlled by control values 302a, 302b, 302c respectively so as to adjust the flow velocities or the flow rates of the pipings respectively.

As described above, the fluid detection nodes 14a, 14b, 14c enable a low-cost configuration that eliminates the need for wiring lines from the outside, and that enables automatic or remote adjustment after the installation. Therefore, installation, and the adjustment work and maintenance work after the installation, are made simple and easy, and consequently a plurality of installations, and a change of piping to be detected, can be facilitated. Incidentally, the control may be performed in such a manner that, for example, when the flow velocity or the flow rate detected by the fluid detection node 14a is abnormal, the analysis unit 50 outputs a signal that notifies the control unit 300 of the abnormality, and the control unit 300 closes the valve 330a of the piping 4a that is provided with the fluid detection node 14a. This enables to detect the abnormality of the piping in an early stage, and therefore the fluid control system 2 becomes safer.

Here, the fluid detection device 1 and the fluid control system 2 according to the present embodiment have been explained by using the example in which air is used as the fluid. However, the fluid may be, for example, a gas such as a nitrogen gas, an oxygen gas and a hydrogen gas, a liquid such as water, oil, a liquefied gas and an organic solvent, or a steam such as a water vapor. In this case, as a supply source of the gas, for example, a gas cylinder and a gas tank can be mentioned. In addition, as a supply source of the liquid, in the case of for example water, a water storage tank can be mentioned. Moreover, as a supply source of the steam, in the case of for example a water vapor, a boiler can be mentioned.

Second Embodiment

Figure 8:
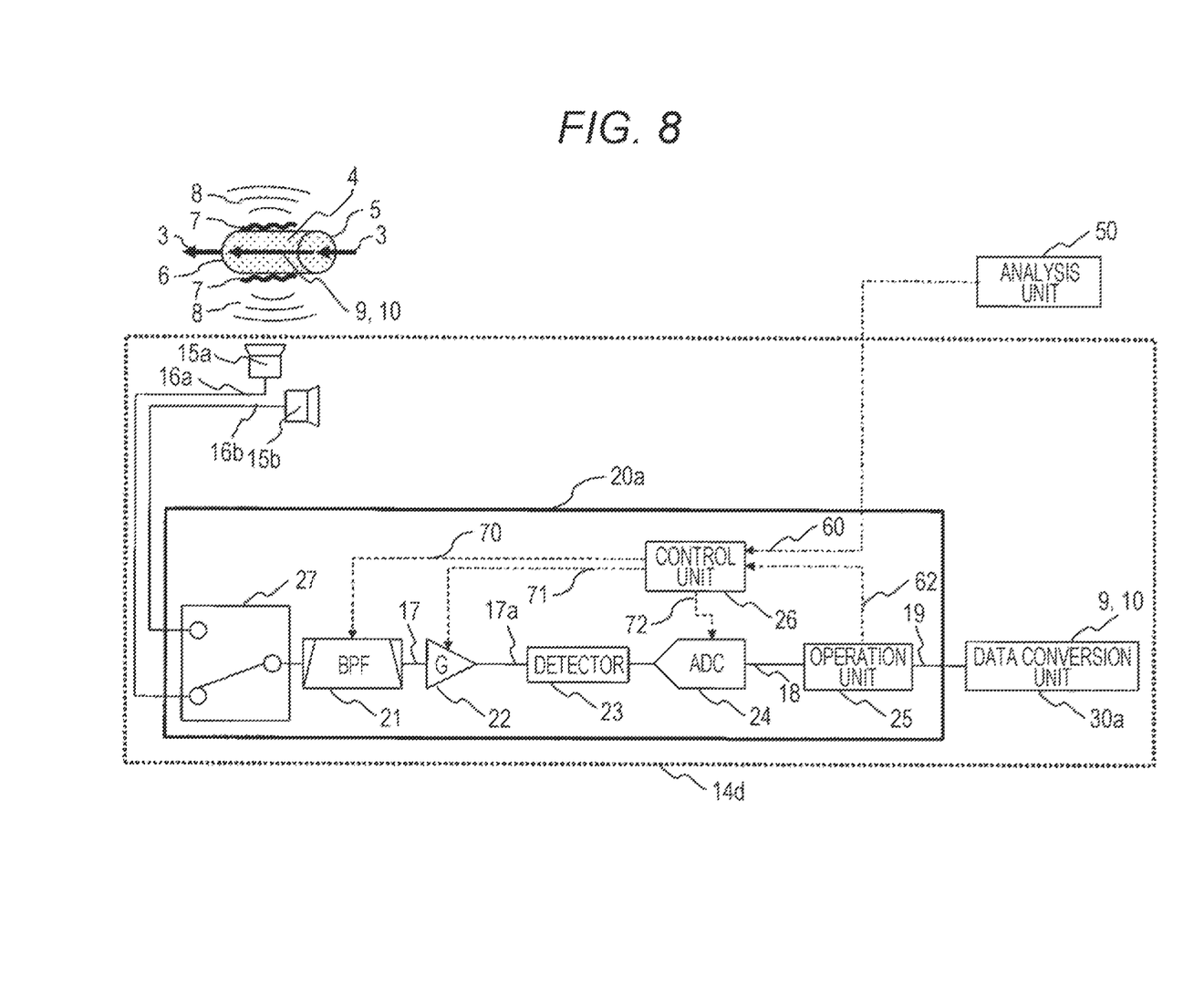
FIG. 8 is an example of a block diagram illustrating a fluid detection device according to a second embodiment of the present invention.
Figure 9:
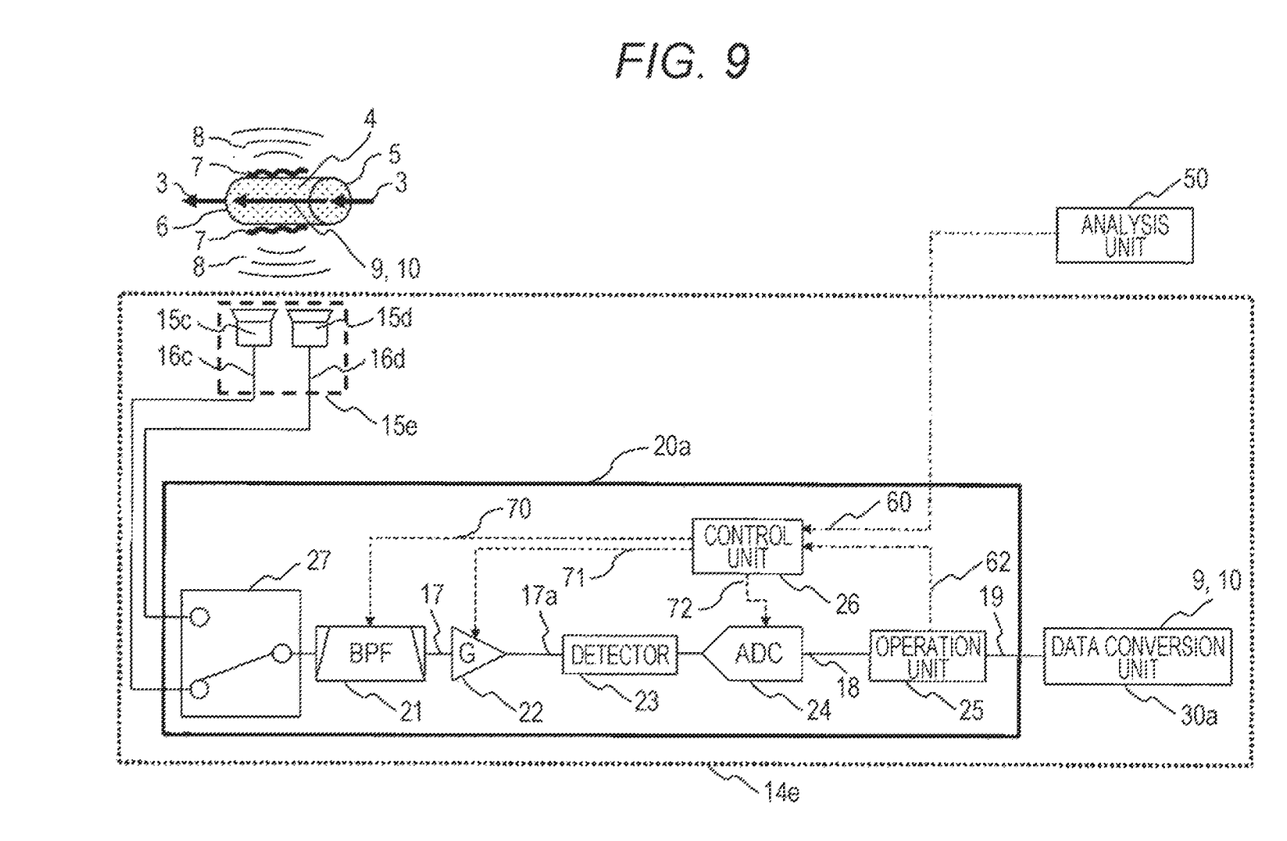
FIG. 9 illustrates, as an example, a modified example of the fluid detection device according to the second embodiment of the present invention.

Next, a second embodiment of the present invention will be described with reference to FIGS. 8 and 9. FIG. 8 is an example of a block diagram illustrating a fluid detection device according to the second embodiment of the present invention. FIG. 9 illustrates, as an example, a modified example of the fluid detection device according to the second embodiment of the present invention. The present embodiment differs from the first embodiment in that a fluid detection node is configured to use a large number of ultrasound microphones. When FIGS. 8 and 9 are described below, detailed descriptions of components identical to those in FIGS. 1 and 3 will be omitted, and points of difference will be mainly described.

As shown in FIG. 8, a fluid detection node 14d is provided with a set of ultrasound microphones 15a, 15b. A signal processing unit 20a is configured to be provided with a selection unit 27 between the set of ultrasound microphones 15a, 15b and the bandpass filter 21. It should be noted that the number of ultrasound microphones may be three or more. In addition, as the selection unit 27, for example, a semiconductor switching device or a relay has only to be used.

As shown in FIG. 8, the ultrasound microphone 15a is provided to face the piping 4 so as to collect the ultrasound 8 of the piping 4, whereas the ultrasound microphone 15b is provided in a direction different from that of the ultrasound microphone 15a so as to collect only external noises in an installation environment. Frequency signals 16a, 16b detected by the ultrasound microphones 15a, 15b respectively are input into the signal processing unit 20a. Subsequently, the data conversion unit 30 determines a difference between the frequency signals 16a, 16b, thereby eliminating noise components around the piping 4. Consequently, the detection precision of detecting the flow velocity 9 or the flow rate 10 can be enhanced. In addition, increasing the number of ultrasound microphones, each of which detects ambient noises of the piping 4, enables to further eliminate noise components, and therefore the detection precision can be further enhanced.

It should be noted that the difference between the frequency signals 16a, 16b may be determined by the operation unit 25.

Moreover, as shown in FIG. 8, the respective frequency signals 16a, 16b of the ultrasound microphones 15a, 15b are selected by the selection unit 27 in a time-division manner, and the signal processing unit 20a and the data conversion unit 30a also operate in a time-division manner in synchronization with the selection. Consequently, only one set of the signal processing unit 20a and the data conversion unit 30a suffices. Therefore, even in a case where a plurality of ultrasound microphones are used, a small-sized and low power consumption fluid detection node can be formed.

Meanwhile, in a modified example shown in FIG. 9, a node 14e has an array in which the ultrasound microphones 15c, 15d are put side by side to form an ultrasound microphone array 15e. It should be noted that the number of ultrasound microphones may be three or more.

Consequently, the amount of sounds collected can be increased, and therefore the flow velocity or the flow rate can be detected with high sensitivity. In addition, even when one ultrasound microphone gets out of order, another ultrasound microphone is capable of detecting the ultrasound from the piping 4. This enables to increase the long-term usability of the fluid detection device. Moreover, a directivity of the ultrasound to be detected can be obtained by synthesizing the frequency signals 16c, 16d of the ultrasound microphone array 15e, and therefore the detection sensitivity can be enhanced.

It should be noted that in a case where a plurality of ultrasound microphones are installed, similar effects can be achieved not only by arranging the ultrasound microphones in parallel as shown in FIG. 9, but also by arranging the ultrasound microphones so as to face each other.

Although the embodiments of the present invention have been described as above, the present invention is not limited to the embodiments, but includes various modified examples. For example, the above embodiments have been described in detail in order to clearly explain the present invention. Therefore, the present invention is not always limited to the invention having all of the explained configurations. In addition, a configuration of a certain embodiment may be partially replaced with a configuration of another embodiment, and a configuration of another embodiment may be added to a configuration of a certain embodiment. Moreover, a partial addition, deletion or replacement of a configuration of another example may be made to a part of a configuration of each example.

What is claimed is:

1. A detection device that detects a flow velocity or a flow rate of a fluid flowing through a piping, the detection device comprising:
   a sound detection unit that detects a sound of the piping, and outputs a frequency signal;
   a signal processing unit that calculates a strength ratio of the frequency signal on the basis of the frequency signal and a predetermined reference frequency signal;
   a data conversion unit that obtains the flow velocity or the flow rate on the basis of the strength ratio of the frequency signal and a predetermined fluid characteristic function;
   a data accumulation unit that stores the flow velocity or the flow rate obtained by the data conversion unit;
   an analysis unit that analyzes the flow velocity or the flow rate stored in the data accumulation unit, and then feeds back a result of the analysis to the signal processing unit or the data conversion unit, wherein
      the data accumulation unit includes fluid information of the fluid flowing through the piping, piping information of the piping provided with the sound detection unit, and environmental information of an environmental surrounding the piping, and
      the analysis unit corrects a detection parameter of the signal processing unit or a fluid characteristic function of the data conversion unit by using the flow velocity or the flow rate, the fluid information, the piping information and the environmental information.

2. The detection device according to claim 1, wherein
the data conversion unit holds the fluid characteristic function derived from the frequency signal and the reference frequency signal in a case where the flow velocity or the flow rate is known.

3. The detection device according to claim 1, further comprising
a power supply unit that supplies an electric power to the sound detection unit, the signal processing unit and the data conversion unit.

4. The detection device according to claim 3, further comprising
a sensing unit that detects a temperature, a humidity and an atmospheric pressure around the fluid detection device, and outputs the temperature, the humidity and the atmospheric pressure to the data conversion unit,
wherein the data conversion unit calculates the flow velocity or the flow rate on the basis of the temperature, the humidity and the atmospheric pressure.

5. The detection device according to claim 1, further comprising
another sound detection unit that differs from the aforementioned sound detection unit,
wherein the signal processing unit calculates the strength ratio of the frequency signal on the basis of the frequency signal and another frequency signal from the other sound detection unit.

6. The detection device according to claim 5, wherein
the sound detection unit is provided so as to face the piping,
the other sound detection unit is provided in a direction different from the direction of the sound detection unit, and
the data conversion unit determines a difference between the frequency signal and the other frequency signal from the other sound detection unit to calculate the strength ratio of the frequency signal.

7. The detection device according to claim 5, wherein
the sound detection unit and the other sound detection unit are arranged in parallel in the same direction.

* * * * *